United States Patent [19]
Atkins et al.

[11] Patent Number: 5,287,427
[45] Date of Patent: Feb. 15, 1994

[54] METHOD OF MAKING AN ARTICLE COMPRISING AN OPTICAL COMPONENT, AND ARTICLE COMPRISING THE COMPONENT

[75] Inventors: Robert M. Atkins, Millington; Paul J. Lemaire, Madison; Victor Mizrahi, Bedminster; Kenneth L. Walker, New Providence, all of N.J.

[73] Assignee: AT&T Bell Laboratories, Murray Hill, N.J.

[21] Appl. No.: 10,237

[22] Filed: Jan. 28, 1993

Related U.S. Application Data

[63] Continuation-in-part of Ser. No. 878,802, May 5, 1992, Pat. No. 5,235,659.

[51] Int. Cl.$^5$ .............................................. G02B 6/00
[52] U.S. Cl. ............................................. 385/124; 65/1; 430/56
[58] Field of Search .............. 65/1, 3.12, 3.11, 4.2; 430/56, 57, 60; 385/123, 124, 129, 130

[56] References Cited

U.S. PATENT DOCUMENTS

| | | | |
|---|---|---|---|
| 4,406,517 | 9/1983 | Olshansky | 385/124 |
| 4,439,007 | 3/1984 | Lazy et al. | 385/124 X |
| 4,521,351 | 6/1985 | Ohtsuka et al. | 385/124 X |
| 4,664,474 | 5/1987 | Tanaka et al. | 385/124 X |
| 4,715,695 | 12/1987 | Nishimura et al. | 385/124 X |
| 4,725,110 | 2/1988 | Glenn et al. | 350/3.61 |
| 4,807,050 | 2/1989 | Glenn et al. | 350/3.61 |
| 4,893,896 | 1/1990 | Tanaka et al. | 385/124 |
| 5,123,076 | 6/1992 | Nishimoto et al. | 385/124 |
| 5,212,757 | 5/1993 | Brownlow et al. | 385/124 X |

OTHER PUBLICATIONS

"Permanent Photoinduced Birefringence in Ge-doped Fiber", by F. Ouellette et al., Applied Physics Letters, vol. 58(17), Apr. 29, 1991, pp. 1813-1815.

"Bragg Grating Formation and Germanosilicate Fiber Photosensitivity", by G. Meltz et al., SPIE, vol. 1516, International Workshop of Photoinduced Self-Organization in Optical Fiber, May 10-11, 1991, Quebec City, Canada, Paper 1516-18.

"Photosensitive Changes in Ge-Doped Fibres, Observed by Raman Spectroscopy", by D. McStay, SPIE, vol. 1314, Fibre Optics '90, pp. 223-233.

*Primary Examiner*—Akm E. Ullah
*Attorney, Agent, or Firm*—Eugen E. Pacher

[57] ABSTRACT

Unexpectedly large normalized refractive index changes ($\Delta > 10^{-5}$, but possibly even larger than $10^{-3}$) can be obtained in oxide glass, e.g., high-silica glass, by a treatment that comprises exposing at least a portion of the glass at a temperature of at most 250° C. to $H_2$ or $D_2$ (partial $H_2$ or $D_2$ pressure greater than 1 atmosphere), and irradiating at least a part of the exposed portion with actinic (typically UV) radiation. The method can be used to make optical components that comprise a region (or regions) of raised refractive index, e.g., an in-line refractive index grating in an optical waveguide, a planar optical waveguide, or a phase grating.

18 Claims, 3 Drawing Sheets

5,287,427

METHOD OF MAKING AN ARTICLE COMPRISING AN OPTICAL COMPONENT, AND ARTICLE COMPRISING THE COMPONENT

CROSS-REFERENCE TO RELATED APPLICATION

This application is a continuation-in-part of U.S. patent application Ser. No. 07/878,802, filed May 5, 1992, now U.S. Pat. No. 5,235,659.

FIELD OF THE INVENTION

This invention pertains to a method of making an article that comprises an optical component, e.g., a planar waveguide. More particularly, it pertains to a method that comprises locally changing the refractive index of a oxide glass body. It also pertains to articles made by the method.

BACKGROUND OF THE INVENTION

In-line optical fiber refractive index gratings are known. See, for instance, U.S. Pat. No. 4,807,950, incorporated herein by reference. See also, U.S. Pat. No. 4,725,110, which claims a method of producing such a grating. The currently preferred method of "writing" an in-line grating into optical fiber comprises interference between two beams of actinic (typically UV) radiation in a portion of the fiber. The two beams are incident on the fiber in a traverse direction, the angle between the two beams (and the wavelength of the radiation) defining the grating spacing.

Typically fiber gratings are formed in Ge-doped fiber. See, for instance, F. Ouellette et al., *Applied Physics Letters*, Vol. 58(17), p. 1813 which inter alia discloses that the sensitivity of the Ge-doped fiber to actinic radiation can be enhanced by a thermal hydrogen treatment (4 hours at 400° C. in 12 atmospheres of $H_2$). See also G. Meltz et al., *SPIE*, Vol. 1516, International Workshop on Photoinduced Self-Organization in Optical Fiber, May 10-11, 1991, Quebec City, Canada, paper 1516-18, which reports treating a heavily-doped germanosilicate preform rod for 75 hours at 610° C. in 1 atmosphere of $H_2$ to enhance the photosensitivity of the glass. U.S. patent application Ser. No. 643,886 filed Jan. 18, 1991 for R. M. Atkins et al., discloses a process of manufacturing optical fiber that enhances the GeO/GeO$_2$ ratio in the Ge-doped core of the fiber, thereby enhancing the sensitivity of the fiber to actinic radiation. The process involves, exemplarily, collapsing the preform tube in a substantially oxygen-free atmosphere.

The prior art $H_2$ sensitization treatments involve exposure of the glass to $H_2$ at a relatively high temperature, typically at least 400° C. This high temperature treatment would at best be inconvenient if applied to optical fiber. As is well known, optical fiber typically is coated with a polymer material as part of the draw process, since uncoated fiber is fragile and rapidly loses its strength, especially if handled. At the temperature of the prior art $H_2$ treatments, typical polymer fiber coatings would be destroyed or at least severely damaged. Furthermore, the prior art high temperature sensitization treatment frequently increases the optical loss in the fiber and/or may weaken the fiber.

D. McStay, *SPIE*, Vol. 1314, "Fibre Optics '90", pp. 223-233, inter alia reports exposing Ge-doped optical fiber to $H_2$ for various times at various temperatures and pressures, exemplarily 3 days at 24° C. and 1 atmosphere. Raman measurements were interpreted to reveal the presence of molecular hydrogen in the fiber after the exemplary treatment. Exposure of the fiber to 488 nm radiation resulted in increase of a Raman peak at about 2150 $cm^{-1}$. The peak appeared even if irradiation was delayed until after essentially all of the $H_2$ had again been lost from the fiber. The author disclosed that the observed photosensitive reaction was a weak one, and suggested that a two-photon process may be involved. No refractive index change was observed.

In view of the potential advantages offered by in-line refractive index gratings in optical waveguides, it would be highly desirable to have available a method of locally increasing a waveguide refractive index that is free of the above-discussed shortcomings of the prior art. Furthermore, it would be very desirable if strong in-line gratings could be written into optical fiber of the type conventionally manufactured and installed for optical fiber communication systems, or if an optical waveguide could be "written" into a planar glass layer. This application discloses a method that has these and other advantageous features.

GLOSSARY

An "optical waveguide" herein is a, typically elongate, structure that comprises a "core" of relatively high refractive index glass that is at least partially surrounded by a "cladding" of relatively low refractive index material, and that is adapted for transmitting therethrough (typically in the longitudinal direction) electromagnetic radiation of "optical" wavelength, exemplarily in the range 0.4–1.7 μm.

SUMMARY OF THE INVENTION

We have introduced relatively large quantities of molecular hydrogen ($H_2$) into high-silica glass (exemplarily more than 50 or 80 mole percent $SiO_2$) at quite low temperatures (at most 250° C., but preferably below 150° or even 100° C.) and moderate pressures ($H_2$ partial pressure greater than 1 atmosphere, preferably greater than 10 atmospheres), and have made the quite unexpected discovery that irradiation of the $H_2$-containing glass with actinic radiation (typically UV) can increase the refractive index of the glass in the irradiated region by an unprecedentedly large amount. Exemplarily the normalized index changes ($\Delta = \Delta n/n$) are at least but preferably are at least $5 \times 10^{-5}$ or $10^{-4}$, and can be even larger than $10^{-3}$. The changes can persist substantially indefinitely if the glass is not heated, with at least a significant fraction of the change surviving moderate heating (e.g., $\leq 400°$ C.) of the glass. Index changes of less than $10^{-5}$ can of course be produced but are typically not commercially useful.

The invention relates to a method of making an article that comprises an optical component, (e.g., an optical fiber, a planar waveguide or a phase mask) and, in one exemplary embodiment, comprises providing the waveguide, exposing the waveguide to $H_2$ and irradiating at least a portion of the waveguide with actinic radiation such that the refractive index of the irradiated portion is changed. Significantly, during the $H_2$-exposure step the waveguide is at a temperature of at most 250° C. The waveguide is exposed to a $H_2$-containing atmosphere that has a $H_2$ partial pressure of at least 1 atmosphere, and the resulting normalized index change is at least about $10^{-5}$, and preferably is at least $5 \times 10^{-5}$ or $10^{-4}$. By "hydrogen" or "$H_2$" we mean herein hydrogen and/or its isotope deuterium.

In another exemplary embodiment the invention comprises exposing a body that comprises high-silica glass to hydrogen in substantially the above described manner, followed by exposure of the glass to actinic radiation such that the refractive index in a predetermined region of the glass is raised by an appropriate amount, exemplarily such that the core of a planar waveguide is formed.

The inventive method can be used in a variety of ways. For instance, it can be used to make in-line refractive index gratings in optical fiber or in planar waveguides, or it can be used to produce a substantially uniform index change in a portion of an optical fiber or planar waveguide. It can also be used to "write" the core of a planar optical waveguide into appropriate glass, and to pattern the refractive index of an appropriate glass body such that, e.g., a hologram or phase mask results.

DETAILED DESCRIPTION OF SOME PREFERRED EMBODIMENTS

Exemplary of the novel hydrogen treatment is the following. Three samples of standard, commercially available, optical communications fiber (namely, AT&T's 5D fiber which has a germanosilicate core, with about 2.6 mole % $GeO_2$, and which, absent a sensitization treatment, exhibits no significant photosensitivity; exemplarily $\Delta \lesssim 10^{-5}$) were maintained at 75° C. for periods of 48–72 hours in a hydrogen atmosphere at 10.4, 42 and 147 atmospheres. The resulting $H_2$-concentrations in the fiber core were calculated to be, respectively, $6.98 \times 10^2$, $2.82 \times 10^3$, and $9.84 \times 10^3$ parts per million (ppm; 1 ppm is defined as $10^{-6}$ moles $H_2$ per mole of $SiO_2$). Exposure of the thus prepared fibers to UV radiation (about 242 nm) from an excimer pumped, frequency doubled dye laser (20 pulses/second, 2 mJ/pulse, 10 minutes exposure) resulted, respectively, in the following normalized index changes $\Delta(\Delta = \Delta n/n)$: $9.7 \times 10^{-5}$, $7 \times 10^{-4}$, and $1.8 \times 10^{-3}$. Increasing the exposure to the actinic radiation would not have substantially further increased $\Delta$.

Another commercially available optical fiber (having about 10 mole % $GeO_2$ in the core), was maintained at 50° C. in 95 atmospheres of $H_2$ for 3 days resulting in about $8.04 \times 10^3$ ppm $H_2$ in the fiber core. Exposure (1.5 mJ/pulse, 50 pulses/second, 8 minutes) to the above-described UV radiation resulted in $\Delta = 1.6 \times 10^{-3}$.

Figure 1:
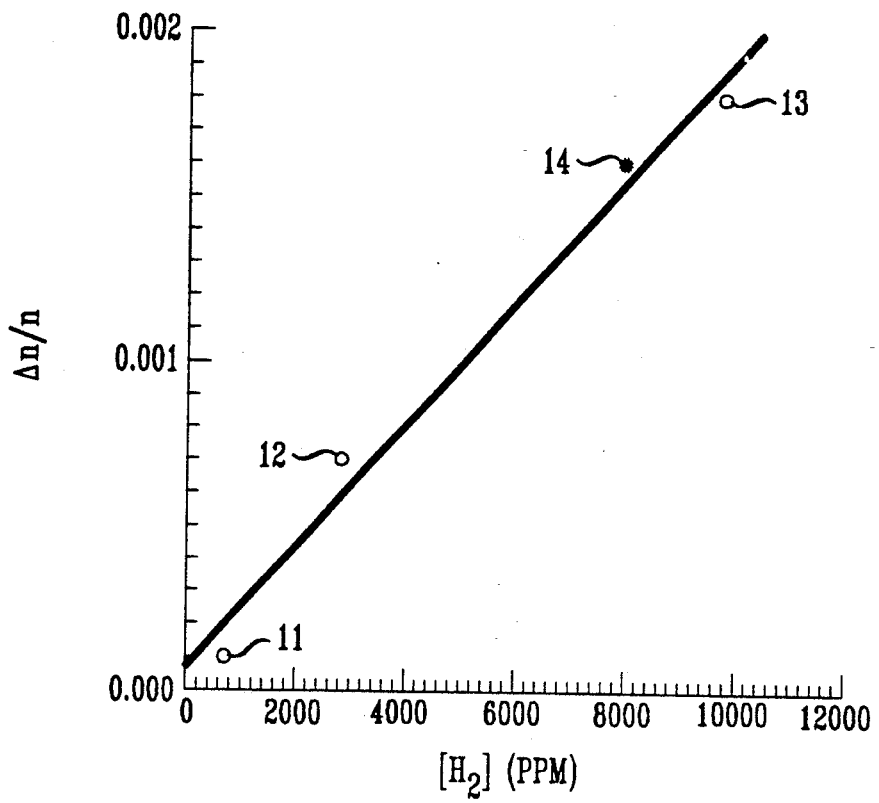
FIG. 1 presents exemplary data on UV-induced refractive index change as a function of $H_2$ concentration in the glass.

These exemplary results are shown in FIG. 1, wherein points 11, 12 and 13 pertain to the lightly Ge-doped (5D) fiber, and 14 pertains to the moderately Ge-doped fiber. As FIG. 1 illustrates, there appears to exist a substantially linear relationship between $H_2$ content in the fiber and the attainable value of index change, at least for some range of Ge-doping.

Although some useful index change may be obtainable also for very low levels of Ge-doping (e.g., <0.5 mole % of $GeO_2$), the invention will frequently be embodied in silica glass (i.e., oxide glass in which $SiO_2$ is the largest single constituent) comprising at least 0.5 mole % $GeO_2$ or other appropriate dopant, or in germania glass (i.e., in oxide glass in which $GeO_2$ is the largest single constituent; including pure vitreous germania). Pure $SiO_2$ does not exhibit any significant index change, substantially independent of the $H_2$ concentration in the fiber (at least up to about 8,400 ppm $H_2$). We currently believe that the invention can be embodied in many oxide glasses that comprise $GeO_2$, or that comprise $SiO_2$ and $GeO_2$ or other appropriate dopant. One of ordinary skill in the art generally will be able to determine, with only a modest experimental effort, whether an oxide glass of a given composition is suitable for the practice of the invention.

Other exemplary results are as follows: maintaining an optical fiber at 200° C. for 40 minutes in 150 atmospheres of $H_2$ results in about $4.56 \times 10^3$ ppm of $H_2$ in the core. And maintaining a planar structure comprising a 25 $\mu$m thick layer of $SiO_2$, with an underlying germanosilicate glass layer (8 $\mu$m thick, 2.6 mole % $GeO_2$) at 21° C. for 6 days in 187 atmospheres $H_2$, or at 75° C. for 11 hours at 325 atmospheres $H_2$, is estimated to result in sufficient $H_2$ loading to generate a waveguide core in the germania-doped glass with $\Delta \sim 4 \times 10^{-3}$, after exposure to UV radiation.

We currently believe that the prior art (high temperature) hydrogen treatment involves a different physical mechanism than does the inventive (low temperature) treatment. The experimental facts disclosed by McStay (op. cit.) also clearly show that the weak photosensitivity observed by him is due to a different mechanism than the large photorefractive effect that can result from a treatment according to the invention.

It will be appreciated that, after completion of loading the glass with $H_2$, some of the hydrogen will generally again diffuse out of the glass, at a rate that depends inter alia on temperature. However, the rate typically is slow enough such that there is ample time (typically many hours) to irradiate the glass with actinic radiation. Exemplarily, irradiation should take place within about one week from the completion of the hydrogen loading. Those skilled in the art will recognize the cold storage of the fiber will retard out-diffusion, making longer delays possible.

Loss of $H_2$ from the unirradiated portions of the glass has the desirable consequence that the inventive method results in relatively little increase of the optical loss in the waveguide, and in substantially no change in refractive index in the unirradiated portions.

The question of reliability of index gratings in fiber is of concern to those involved in the development of such gratings. By this we mean that there is concern in the field whether or not the properties (e.g., optical strength) of such gratings will change with time, especially if a grating is exposed to elevated temperatures. Similar considerations apply to other articles according to the invention.

Figure 2:
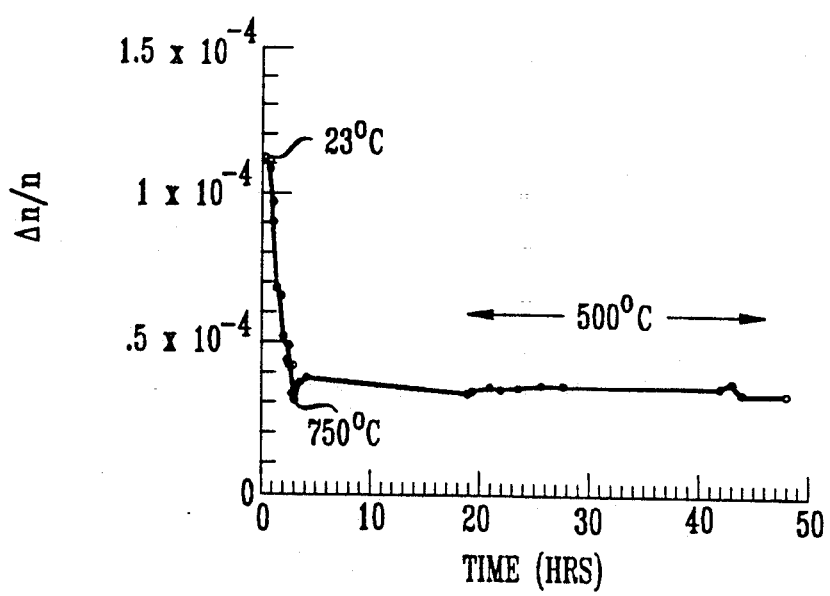
FIG. 2 shows exemplary data on refractive index as a function of time during the course of a particular heat treatment of an optical fiber.

The inventive method can result in highly stable refractive index change, as is exemplarily illustrated by FIG. 2, which shows the normalized refractive index change $\Delta$ as a function of time, for an exemplary commercially available (5D) fiber that had previously been loaded with $H_2$ and exposed to UV radiation such that a refractive index grating (index spacing about 0.5 μm) was formed in the fiber. The fiber contained about $9.3 \times 10^3$ ppm $H_2$ but the UV exposure was limited such that a grating of moderate strength ($\Delta \sim 1.1 \times 10^{-4}$) resulted. After the grating was fully formed the fiber was heated to 750° C. at 250° C./hour, followed by cooling to room temperature. As can be seen from FIG. 2, after reaching 750° C. the normalized index change had decreased to about $3 \times 10^{-5}$. About 19 hours after the start of the temperature treatment the fiber was heated to 500° C. and maintained at that temperature for about 29 hours. As can be seen from FIG. 2, the refractive index remained essentially constant during this time, indicating that the previous annealing had eliminated relatively unstable species, with the remaining species being stable even at the very high temperature of 500° C.

The inventive method optionally comprises an anneal that results in substantial elimination of relatively unstable species, whereby the reliability of the index change in the fiber can be improved. Generally, the anneal involves heating of the waveguide (or of a relevant portion thereof, e.g., substantially only the waveguide core) to a temperature above any anticipated operating temperature of the waveguide. This heating can take place during exposure to actinic radiation, or subsequent thereto. It can also take place subsequent to a first and prior to a second exposure. A preferred method of heating substantially only the waveguide core comprises coupling into the waveguide radiation of a wavelength at which the UV irradiated portion of the waveguide absorbs, e.g., at about 1.4 μm for $H_2$-treated fiber. It will be appreciated that by "heating" in this context we mean heating for a period of time (exemplarily at least a minute) that is effective for removing at least a major portion of the defects that are not stable at the anneal temperature. The term does not include any transitory heating that may be associated with the incidence of an individual pulse of the actinic radiation.

As those skilled in the art will recognize, annealing results in a (typically temperature-dependent) decrease in $\Delta$, requiring that the initial $\Delta$ be larger than the desired. It is a simple matter to determine, for a predetermined anneal temperature, the fractional decrease in $\Delta$, and therefore it is a simple matter to determine the appropriate initial $\Delta$, or equivalently, the appropriate $H_2$ loading conditions. In many cases waveguide operating temperatures will not exceed 75° C., and anneal temperatures will frequently be in the range 200°–400° C., (but always higher than the anticipated maximum operating temperature, frequently at least 100° C. higher).

Figure 3:
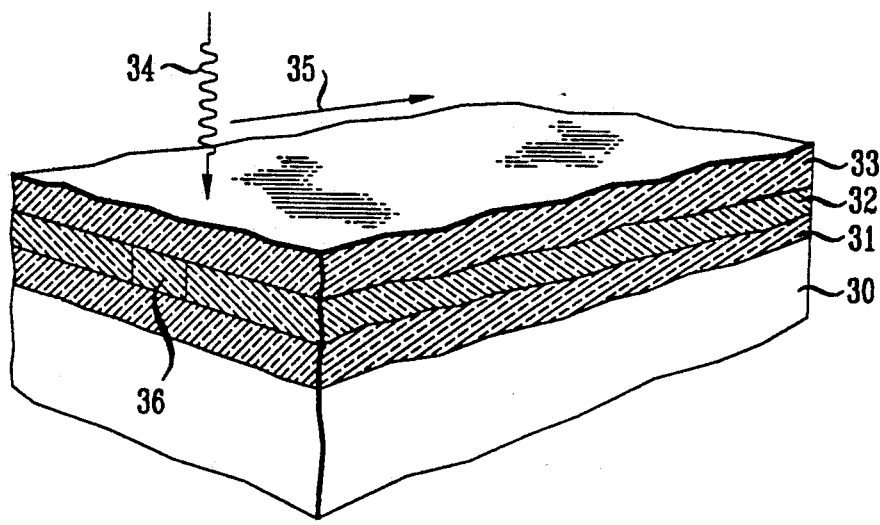
FIG. 3 schematically depicts a novel planar optical waveguide.

As those skilled in the art will appreciate, the inventive method can be used to modify the refractive index not only of optical fiber but also of planar waveguides. Furthermore, the method's ability to readily yield large refractive index changes (e.g., $\Delta n > 10^{-4}$) makes possible a novel method of forming optical components, e.g., planar optical waveguides, as schematically depicted in FIG. 3. Exemplarily, on substrate 30 (e.g., a Si or $SiO_2$ wafer) is formed lower cladding layer 31 (e.g., vitreous silica), doped silica (e.g., germanosilicate) layer 32, and upper cladding layer 33 (e.g., vitreous silica). This structure has waveguiding properties normal to the layers, but does not confine the radiation in the plane. Confinement is achieved by loading the structure with $H_2$, Substantially as described above, irradiating the structure with focused actinic radiation 34, and moving the beam over the structure in a predetermined manner (indicated by arrow 35). (Alternatively, a mask can be used to expose preselected portions.) The refractive index in core region 36 is raised, providing lateral guiding. On the other hand, the index of layers 31 and 33 remains essentially unchanged. It will be appreciated that layers 31 and 33 are optional and that layer 33 can be deposited after exposure of 32 to actinic radiation.

As will be evident to those skilled in the art, the described novel technique for forming planar waveguides has many advantageous features. For instance, it can be used to readily make any desired waveguide configuration without need for $SiO_2$ etching, retaining surface planarity. Importantly, waveguides according to the invention are embedded in structurally homogeneous material and thus are likely to have relatively low scattering loss.

Figure 4:
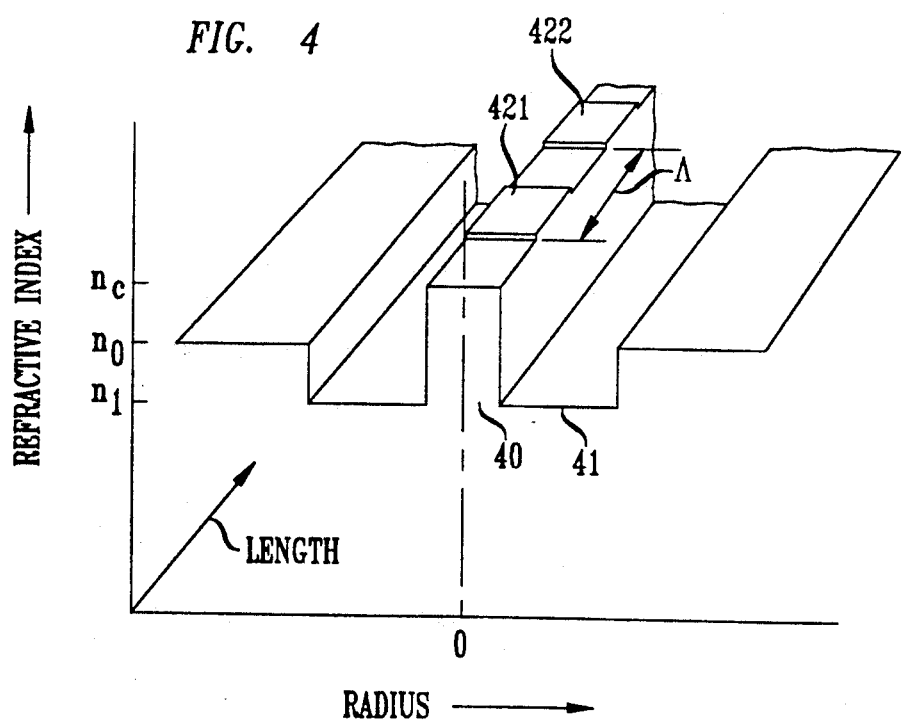
FIG. 4 shows schematically the refractive index vs. radius of an exemplary optical fiber with an in-line index grating.

The inventive method can be embodied in a variety of articles, including optical fiber communications systems, and fiber or planar optical amplifiers. It can also be embodied in optical fiber that has a novel combination of properties, namely a relatively lightly doped core (typically less than 4.5 mole % $GeO_2$ per mole of $SiO_2$) and relatively large localized index variations (typically $\Delta$ at least $10^{-4}$). The refractive index of such a fiber is schematically depicted in FIG. 4, where $n_o$ refers to the refractive index of pure vitreous silica, $n_c$ and $n_1$ to the refractive indices of core 40 and cladding 41, respectively. The normalized core/cladding index difference $\Delta = (n_c - n_1)/n_c$, and 421, 422 ... refers to the localized regions of increased refractive index. Exemplarily, the localized variations are periodic, forming a strong in-line grating whose repeat distance $\Lambda$ is about 0.5 μm, but in many cases is less than about 100 μm. It will of course be understood that the refractive index profile in actual optical fiber is not as regular as the schematic profile of FIG. 4, and that actual profiles do not have such sharp transitions between the various regions. However, actual profiles are frequently described in terms of conventional equivalent step index profile (having effective indices and effective radii). Thus, FIG. 4 is meant to show the equivalent step index profile, and $n_c$ and $n_1$ are intended to be effective refractive indices. It will also be understood that the above discussion refers only to fiber that has axially uniform cross section (i.e., excluding fiber that has been treated to comprise a periodic change of the cross section), and furthermore refers only to fiber wherein the cladding refractive index is substantially unchanged.

As disclosed above, the inventive method can advantageously be used to pattern the refractive index of appropriate oxide glass. This approach was used to make a planar optical waveguide as follows. A glass body (3 mole % $GeO_2$, remainder $SiO_2$; $25 \times 10 \times 2$ mm) was maintained 308 hours at 21° C. in 208 atmospheres $H_2$, resulting in 2.4 mole % $H_2$ concentration at the sample surface, and about 1.1 mole % $H_2$ at 50 μm depth. A beam of UV radiation (242 nm wavelength, 1.5 mj/pulse, 30 pulses/s) was brought to a (about 100 μm wide) line focus, and the focused beam scanned across the width of one of the $25 \times 10$ mm faces of the glass bodies at the rate of 60 μm/s. Subsequent to UV exposure, light from an argon ion laser (514.5 nm wavelength) was focused on one end of the exposed region by means of a ×6 microscope objective. Waveguiding was verified by observation of the far field pattern of the light emerging from the other end of the exposed region. The pattern, observed at a distance of 119 cm from the exit face, was an elliptical spot (about 60×8 mm), with the long axis of the ellipse being parallel to the normal to the exposed face of the glass body, and the short axis of the ellipse being parallel to the width of the exposed region. This established that the exposed region formed a (multimode) waveguide, with the depth of the guide being less than the width. A single mode waveguide can readily be made by a similar process.

Figure 5:
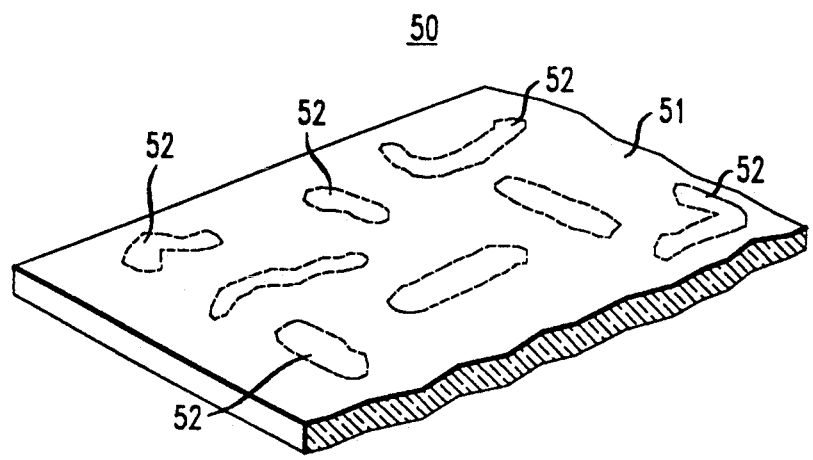
FIGS. 5 and 6 schematically show other exemplary articles according to the invention, namely, a hologram and a phase mask, respectively.

FIG. 5 schematically shows another exemplary article according to the invention, namely, a hologram 50. The article comprises an oxide glass body 51, e.g., a thin plate of Ge-doped vitreous silica, with desired regions 52 of the plate having a higher refractive index than the remainder of the material. The patterned refractive index is produced by appropriate exposure to actinic radiation subsequent to $H_2$-loading of the body, in a manner substantially as described. The appropriate refractive index pattern can either be computed and produced by selective exposure of the body to actinic radiation, or it can result from exposure to interfering beams of actinic radiation. Those skilled in the art will appreciate that an of regions 52 need not have the same refractive index, and that the refractive index can vary within any given region 52. Body 50 can advantageously be used, e.g., for information storage.

Figure 6:
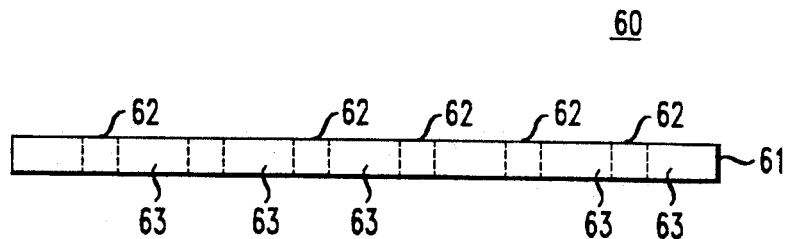

FIG. 6 schematically depicts a particular and currently preferred embodiment of the article of FIG. 5, namely, a phase mask 60 that can be used to, e.g., produce an in-line refractive index grating in an optical waveguide, substantially as described in co-assigned U.S. patent application Ser. No. 08/004,770 entitled "Method for Forming a Bragg Grating in an Optical Medium" filed Jan. 14, 1993, now pending, for D. Z. Anderson et al. Appropriately uniformly doped high silica glass plate 61 comprises spaced apart regions 62 of increased refractive index, relative to regions 63. Regions 62 thus have greater optical thickness than regions 63, with light that is transmitted through a region 62 in general being phase shifted relative to light transmitted through a region 63. The increase in refractive index is advantageously obtained by exposure to actinic radiation subsequent to $H_2$-loading as described. It will be appreciated that the index profile can be readily tailored as desired by, e.g., appropriate choice of exposure conditions.

Loading oxide glass with $H_2$ (or $D_2$) as described above, followed by exposure to actinic radiation, results in the presence of OH (OD) in the exposed regions of the glass, with the OH (OD) level typically being substantially proportional to the index change in the region. Thus, the presence in the glass of regions of relatively high and relatively low OH (OD) concentration typically is a feature of our invention. For instance, a normalized refractive index change $\Delta = 2 \times 10^{-4}$ is associated with about 2000 ppm of OH, and, equivalently, with a loss at 1.39 $\mu$m (the first OH overtone) of about 0.3 dB/cm, and $\Delta = 2 \times 10^{-2}$ is associated with about 20 mole % OH and a loss at 1.39 $\mu$m of about 30 dB/cm. Exemplarily, optical components according to the invention will comprise high-silica glass containing a region of relatively high OH (OD)-content, and therefore relatively high (e.g., >0.1 dB/cm of grating, at 1.39 $\mu$m for OH) optical loss, as well as a region of relatively low OH (OD) content, and therefore relatively low (e.g. <0.1 dB/cm, at 1.39 $\mu$m for OH, typically <0.01 or even 0.001 dB/cm) optical loss.

As those skilled in the art will appreciate, if the glass is sensitized with $D_2$ instead of $H_2$ then the relevant wavelength (the first OD overtone) is about 1.9 $\mu$m. In some optical fibers loss measurements at 1.9 $\mu$m might be difficult, and measurement at 1.26 $\mu$m (the second OD overtone) might be preferable, despite the fact that absorption at the second overtone is much weaker than at the first. However, whatever overtone wavelength is selected, a grating according to the invention in an optical waveguide will have an optical loss (in dB/cm of grating) due to OD that is at least 10 times the optical loss due to OD (in dB/cm) in the grating-free part of the waveguide.

More generally, articles according to the invention will typically comprise a body that comprises oxide glass that comprises a first and a second region, with the former having a normalized refractive index that is greater than that of the latter by at least $10^{-5}$. Furthermore, the glass contains a chemical species selected from OH and OD, with the concentration of said species in at least a part of the first region being at least ten times the concentration of the species in the second region. Aside from the variation in OH or OD, the chemical composition of the glass is essentially the same in said first and second regions. The first region exemplarily is the core of a planar optical waveguide, or a high-index part of an in-line refractive index grating in the core of an optical fiber.

We claim:

1. Method of making an article that comprises an optical component, the method comprising
   a) providing a body that comprises oxide glass,
   b) contacting at least a portion of the glass with an atmosphere comprising gas selected from the group consisting of $H_2$ and $D_2$, said gas to be designated the "sensitizing" gas; and
   c) exposing at least a part of said portion of the glass to actinic radiation such that the refractive index of said exposed part is changed; wherein
   d) step b) comprises contacting the glass at a temperature of at most 250° C., with the atmosphere having a sensitizing gas partial pressure greater than 1 atmosphere, such that irradiation can result in a normalized index change ($\Delta$) of at least $10^{-5}$.

2. Method according to claim 1, wherein the temperature is at most 150° C., the atmosphere is essentially a $H_2$ atmosphere of pressure greater than 10 atmospheres, and $\Delta$ is at least $5 \times 10^{-5}$.

3. Method according to claim 1, wherein the oxide glass is selected from the group consisting of the oxide glasses having $SiO_2$ as their largest constituent and the oxide glasses having $GeO_2$ as their largest constituent.

4. Method according to claim 3, wherein the glass is an oxide glass that comprises more than 50 mole % $SiO_2$, and that further comprises more than 0.5 mole % $GeO_2$.

5. Method according to claim 1, wherein the optical component is an optical waveguide.

6. Method according to claim 5, wherein the optical waveguide is a planar optical waveguide.

7. Method according to claim 1, wherein the refractive index of the irradiated portion is increased by at least $10^{-4}$.

8. Method according to claim 5, wherein the optical waveguide comprises a core that comprises at least 0.5 mole % $GeO_2$.

9. Method according to claim 1, wherein associated with the optical component is a maximum anticipated operating temperature, and wherein the method comprises heating, during and/or subsequent to step c), at least a part of the exposed glass to a temperature that is greater than the maximum anticipated operating temperature of the component.

10. Method according to claim 9, wherein said temperature is at least 100° C. greater than the maximum anticipated operating temperature.

11. Method of claim 9, wherein the component is an optical waveguide comprising a core, and said core is heated by means of radiation coupled into the waveguide.

12. Method of claim 9, further comprising irradiating at least some of said oxide glass with actinic radiation subsequent to said heating step.

13. Method according to claim 1, wherein the article is an optical communication system, and the component is a planar optical waveguide.

14. Method according to claim 1, wherein the optical component is a hologram or a phase mask.

15. An article comprising a body that comprises oxide glass, said glass comprising a first and a second region, with the glass in the first region having a normalized refractive index that is greater than that of the second region; characterized in that the normalized refractive index in at least part of the first region exceeds the normalized refractive index in the second region by at least $10^{-5}$, wherein said glass contains a chemical species selected from the group consisting of OH and OD, with the concentration of said chemical species in at least said part of the first region being at least ten times the concentration of the chemical species in the second region, with the chemical composition of the glass otherwise being essentially the same in said first and second regions.

16. An article according to claim 15, wherein said oxide glass comprises at least 0.5 mole % $GeO_2$.

17. An article according to claim 15, wherein said first region is the core of a planar optical waveguide.

18. An article according to claim 15, wherein said body is a hologram or phase mask.

* * * * *